United States Patent
Costura et al.

(10) Patent No.: US 7,291,197 B2
(45) Date of Patent: Nov. 6, 2007

(54) PARTICULATE TRAP FILTER ELEMENT

(75) Inventors: Joanna Louise Costura, Peoria, IL (US); Matthew E. Williams, East Peoria, IL (US); Matthew T. Kiser, Chillicothe, IL (US); Cornelius N. Opris, Peoria, IL (US); Dave Michael Thaler, Mossville, IL (US); Amy Fluharty, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 386 days.

(21) Appl. No.: 10/901,351

(22) Filed: Jul. 29, 2004

(65) Prior Publication Data

US 2006/0021307 A1 Feb. 2, 2006

(51) Int. Cl.
*B01D 29/52* (2006.01)

(52) U.S. Cl. .................. 55/497; 55/509; 55/523; 55/DIG. 5

(58) Field of Classification Search ........... 55/385.3, 55/490, 497, 499, 498, 500, 509, 511, 521, 55/523, 525, DIG. 5; 210/493.1, 493.2, 210/493.3
See application file for complete search history.

(56) References Cited

U.S. PATENT DOCUMENTS

| | | | | |
|---|---|---|---|---|
| 2,135,863 A * | 11/1938 | Walker | ....... | 55/499 |
| 3,246,920 A * | 4/1966 | Pall | ....... | 210/322 |
| 3,494,113 A * | 2/1970 | Kinney | ....... | 55/481 |
| 3,857,688 A * | 12/1974 | Wisnewski | ....... | 55/483 |
| 4,169,059 A * | 9/1979 | Storms | ....... | 210/493.1 |
| 4,199,387 A * | 4/1980 | Hladik | ....... | 156/160 |
| 4,498,989 A * | 2/1985 | Miyakawa et al. | ....... | 210/450 |
| 4,725,296 A * | 2/1988 | Kurotobi | ....... | 55/497 |
| 4,759,845 A * | 7/1988 | Selesnick | ....... | 210/316 |
| 4,810,379 A * | 3/1989 | Barrington | ....... | 210/232 |
| 4,925,463 A | 5/1990 | Kuhnert | | |
| 5,171,337 A | 12/1992 | Pollock | | |
| 5,342,423 A * | 8/1994 | Taft | ....... | 55/483 |
| 5,401,406 A | 3/1995 | Johnson et al. | | |
| 5,457,945 A | 10/1995 | Adiletta | | |
| 5,500,029 A | 3/1996 | Zievers et al. | | |
| 5,531,892 A * | 7/1996 | Duffy | ....... | 210/493.1 |
| 5,586,996 A * | 12/1996 | Manookian, Jr. | ....... | 55/321 |
| 5,655,366 A | 8/1997 | Kawamura | | |
| 6,013,118 A | 1/2000 | Matsunuma et al. | | |
| 6,485,538 B1 * | 11/2002 | Toyoshima | ....... | 55/490 |
| 6,568,540 B1 * | 5/2003 | Holzmann et al. | ....... | 210/445 |
| 6,572,682 B2 * | 6/2003 | Peter et al. | ....... | 95/278 |
| 2002/0020156 A1 * | 2/2002 | Goerg | ....... | 55/385.3 |
| 2003/0177745 A1 * | 9/2003 | Jauw | ....... | 55/497 |
| 2005/0039427 A1 * | 2/2005 | Karlsson | ....... | 55/497 |

FOREIGN PATENT DOCUMENTS

EP 1 113 154 A2 7/2001

* cited by examiner

*Primary Examiner*—Frank M. Lawrence
(74) *Attorney, Agent, or Firm*—Finnegan, Henderson, Farabow, Garrett & Dunner

(57) ABSTRACT

A filter element has a filter media and at least one base member. The filter element further has a ceramic paste connecting the filter media to the at least one base member.

34 Claims, 7 Drawing Sheets

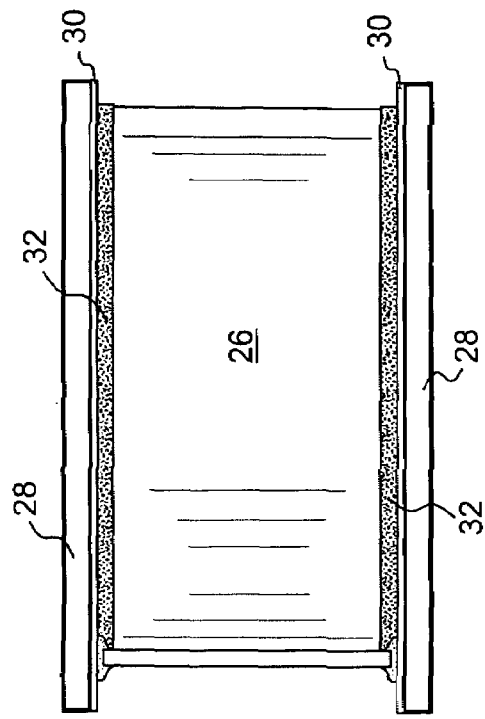
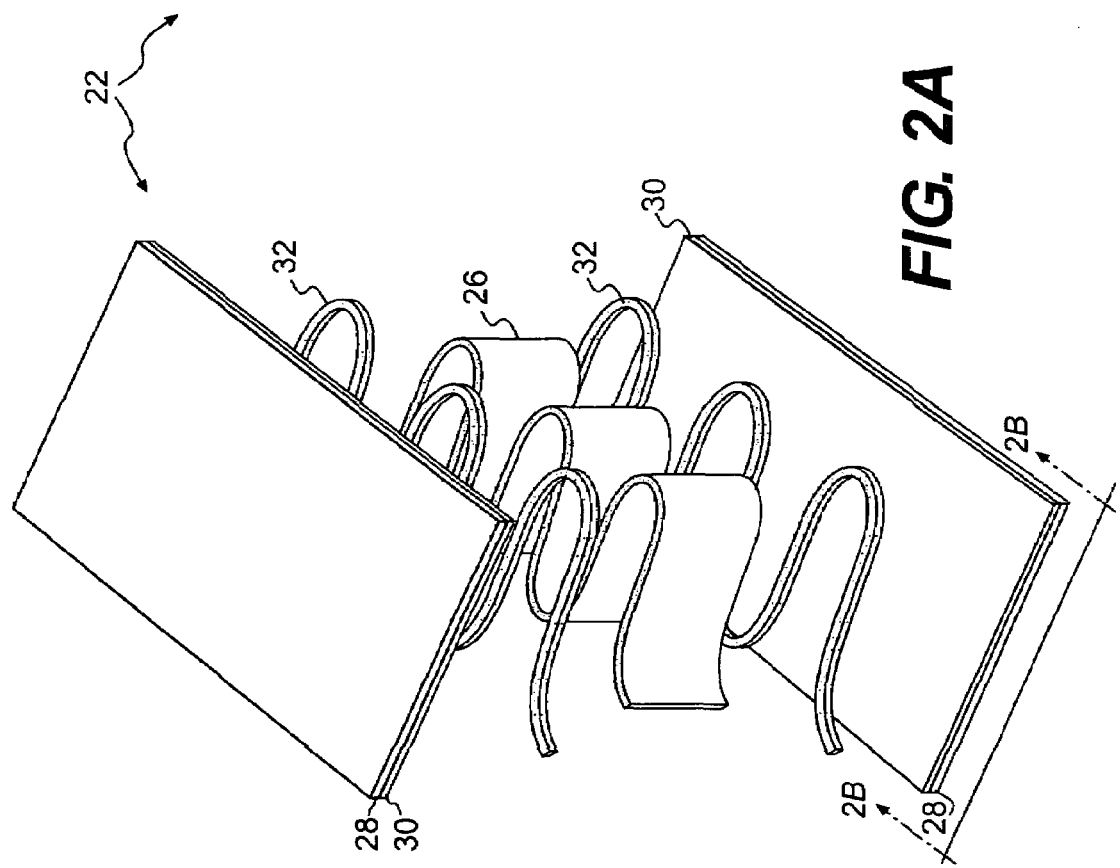
FIG. 2B
FIG. 2A

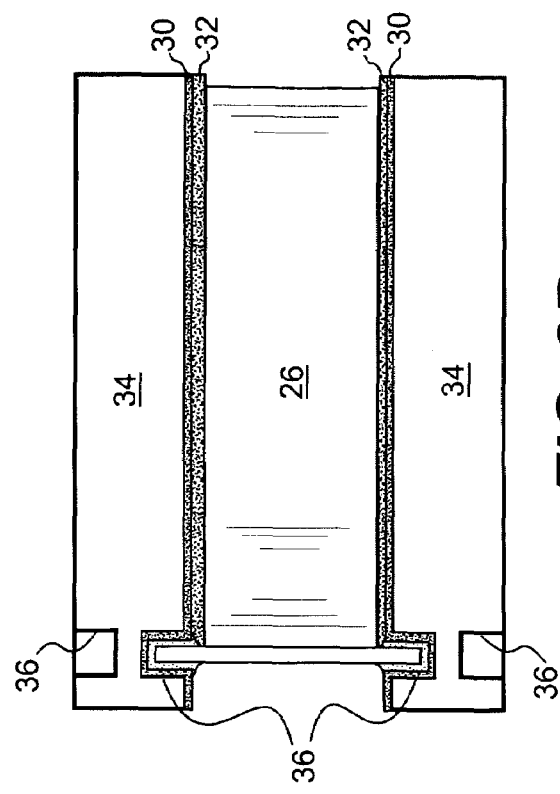
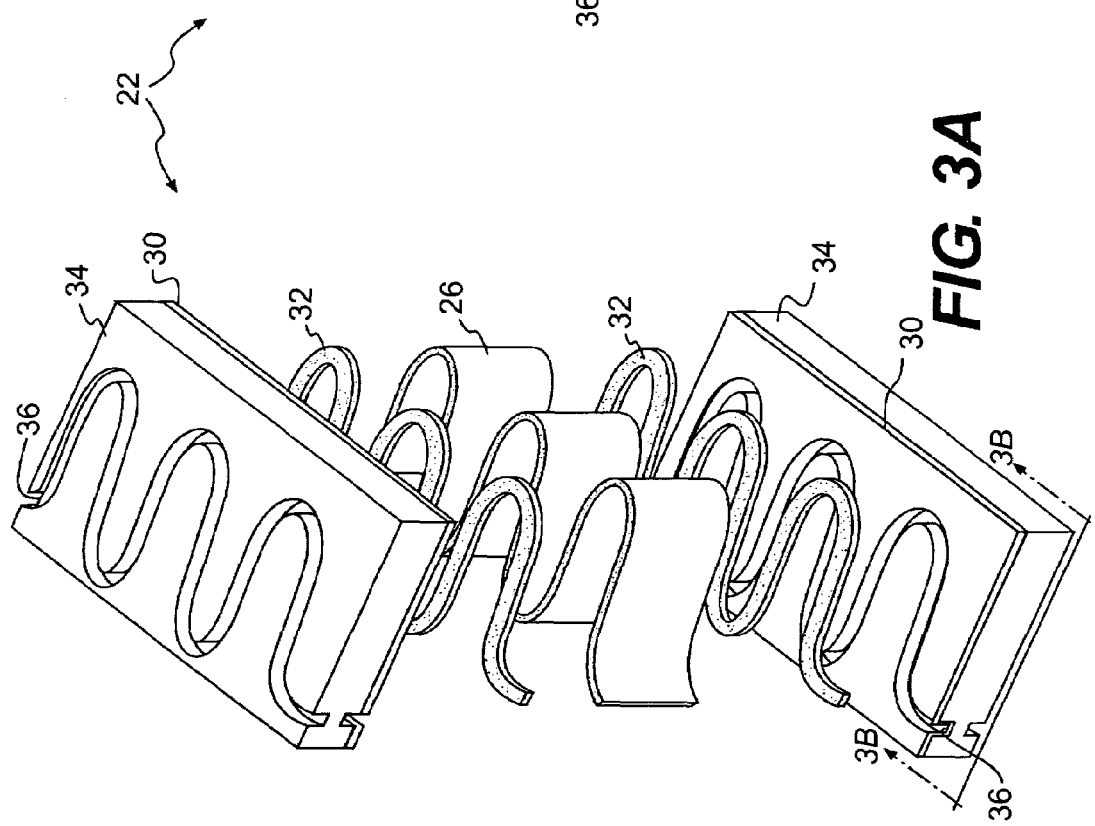
FIG. 3B
FIG. 3A

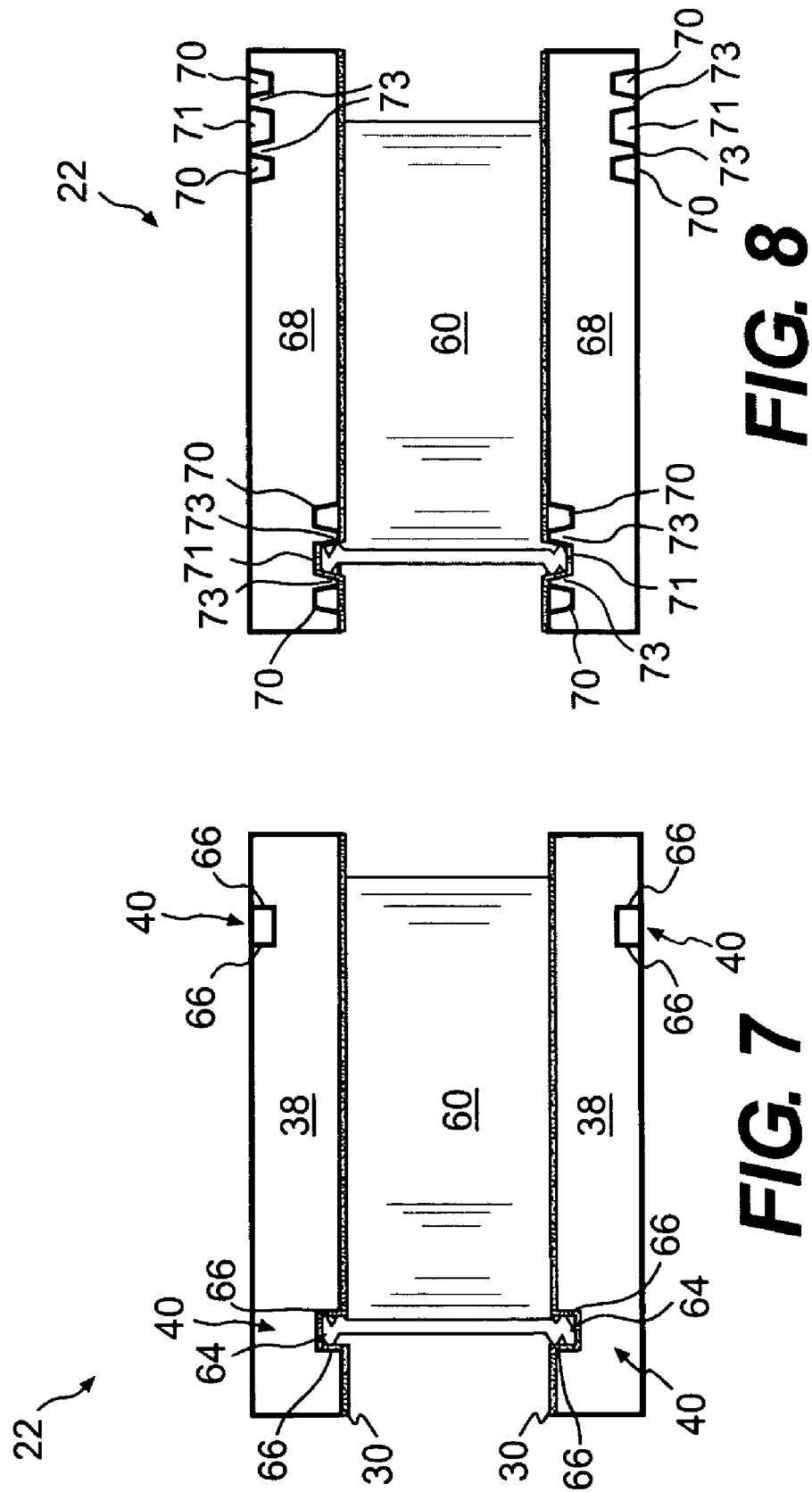

PARTICULATE TRAP FILTER ELEMENT

TECHNICAL FIELD

This disclosure relates generally to a filter element and, more particularly, to a filter element for use in a particulate trap.

BACKGROUND

Internal combustion engines, including diesel engines, gasoline engines, natural gas engines, and other engines known in the art may exhaust a complex mixture of air pollutants. The air pollutants may be composed of gaseous compounds and solid particulate matter, which may include unburned carbon particles called soot.

Due to increased attention on the environment, exhaust emission standards have become more stringent, and the amount of particulates emitted from an engine may be regulated depending on the type of engine, size of engine, and/or class of engine. One method that has been implemented by engine manufacturers to comply with the regulation of particulate matter exhausted to the environment has been to remove the particulate matter from the exhaust flow of an engine using a particulate trap. A particulate trap includes filter elements designed to trap particulate matter.

Various filter elements may be implemented to trap particulate matter. For example, U.S. Pat. No. 5,500,029 (the '029 patent) issued to Zievers et al. on Mar. 19, 1996, describes using a unitary candle filter to remove particulates from an exhaust flow. The candle filter may employ continuous filamentary ceramic material wrapped over a porous ceramic support tube and a mounting assembly. The mounting assembly is cemented to the tube to form a unitary ceramic member that is connected to a tube sheet.

Although the unitary candle filter of the '029 patent may remove particulates from an exhaust flow of an engine, the unitary candle filter is not configured for close stacking of one filter element on top of another filter element, thereby limiting design flexibility of a particulate trap employing the unitary candle filter. In addition, because the unitary candle filter is mounted on only one end, vibrational loading may cause the unitary candle filter to wear and/or fail prematurely.

The disclosed particulate trap filter element is directed to overcoming one or more of the problems set forth above.

SUMMARY OF THE INVENTION

In one aspect, the present disclosure is directed to a filter element. The filter element includes a filter media and at least one base member. The filter element further includes a ceramic paste connecting the filter media to the at least one base member.

In another aspect, the present disclosure is directed to a filter element including a filter media having a portion deformed during assembly. The filter element also includes at least one base member having at least one groove. The deformed portion is disposed within the at least one groove.

In yet another aspect, the present disclosure is directed to a filter element including a filter media, a base member having at least one groove, and a carrier connected to the filter media. The carrier has a protrusion configured to engage the at least one groove.

In yet another aspect, the present disclosure is directed to a method of assembling a filter element having a filter media and at least one base member. The method includes applying ceramic paste to at least one of the filter media and a groove in the at least one base member. The method further includes pressing the filter media into the groove and curing the ceramic paste.

In yet another aspect, the present disclosure is directed to a method of assembling a filter element having a filter media and at least one base member. The method includes pressing a side of the filter media into a groove in the base member to deform a portion of the side within the groove, thereby connecting the filter media to the base member.

In yet another aspect, the present disclosure is directed to a method of assembling a filter element. The method includes positioning a carrier member into a groove of a base member and retaining the carrier member within the groove with a lip of the base member. The method further includes pressing a filter media into the carrier member.

BRIEF DESCRIPTION OF THE DRAWINGS

FIG. 2A is an exploded view diagrammatic illustration of a filter element according to an exemplary disclosed embodiment;

FIG. 2B is an end view diagrammatic illustration of the filter element of FIG. 2A;

FIG. 3A is an exploded view diagrammatic illustration of a filter element according to an exemplary disclosed embodiment;

FIG. 3B is an end view diagrammatic illustration of the filter element of FIG. 3A;

FIG. 7 is an end view diagrammatic illustration of a filter element according to an exemplary disclosed embodiment;

FIG. 8 is an end view diagrammatic illustration of a filter element according to an exemplary disclosed embodiment.

DETAILED DESCRIPTION

Figure 1:
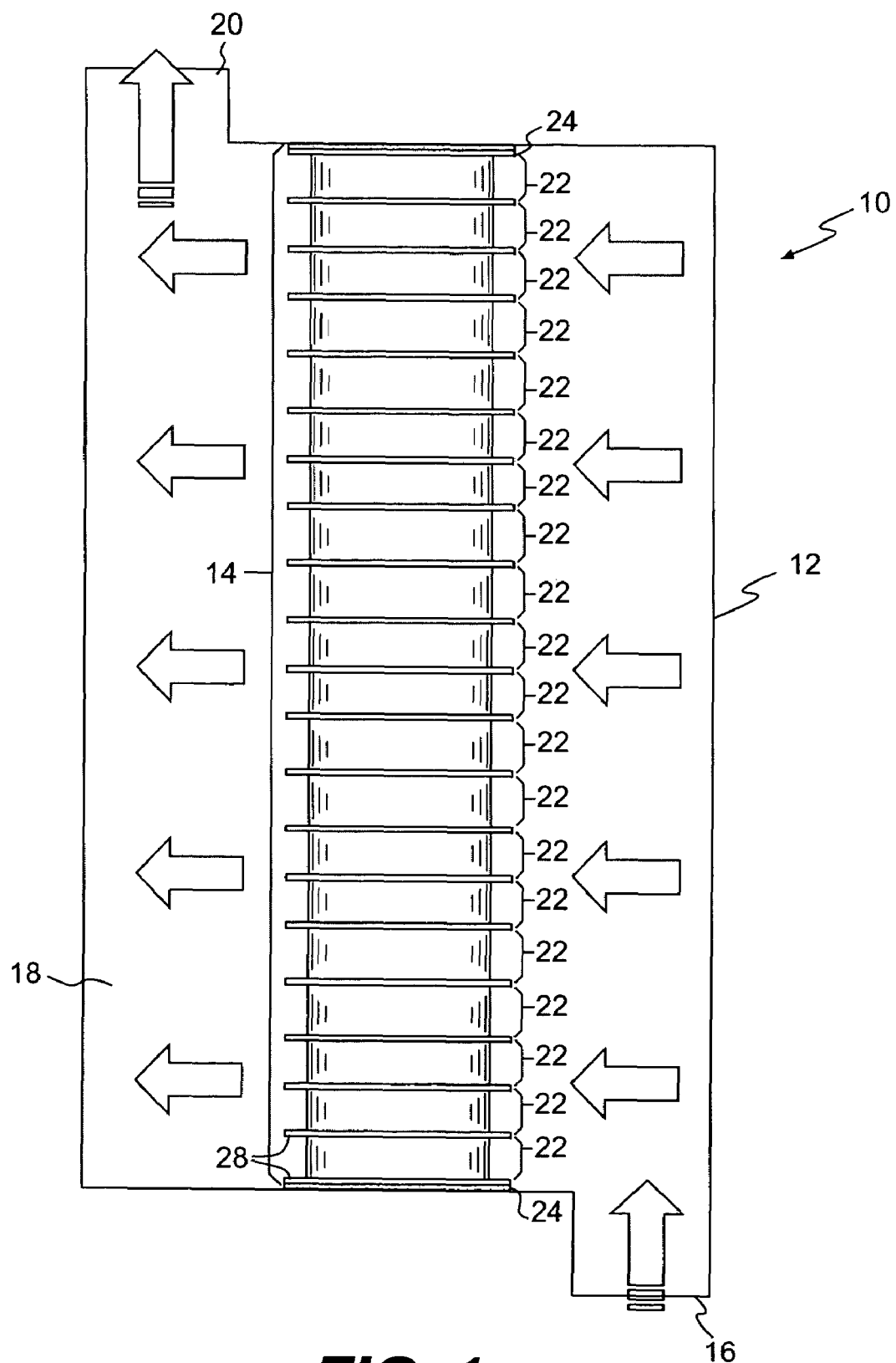
FIG. 1 is a diagrammatic illustration of a particulate trap according to an exemplary disclosed embodiment.

FIG. 1 illustrates an exemplary particulate trap 10. Particulate trap 10 may include a housing 12 and a filter assembly 14 disposed within housing 12 and separated from housing 12 via fibrous ceramic mats 24.

Housing 12 may have an inlet 16 configured to receive gaseous emissions from a particulate-producing system (not shown), a main chamber 18, and an outlet 20. Inlet 16 may have a substantially circular cross-section. It is also contemplated that inlet 16 may have a differently shaped cross-section such as square, rectangular, triangular, or any other suitable cross-section. Inlet 16 may protrude from a first end of housing 12 in a length direction of housing 12. Main chamber 18 may be disposed between inlet 16 and outlet 20, may have a substantially oval-shaped cross-section along a length direction, and may include rounded outer surfaces. It is also contemplated that housing 12 may have a cross-sectional shape other than oval such as, for example, cylindrical, square, rectangular, or another appropriate shape. Outlet 20 may have a substantially circular cross-section. It is also contemplated that outlet 20 may have a differently shaped cross-section such as square, rectangular, triangular, or any other suitable cross-section. Outlet 20 may protrude from a second end of housing 12 in the length direction of housing 12, opposite the first end. It is contemplated that inlet 16 and outlet 20 may alternately protrude from a side of housing 12, orthogonal to the length direction.

Filter assembly 14 may include one or more sub-cartridges 22. Each of sub-cartridges 22 may be stacked on top of another sub-cartridge 22 to form a column of sub-cartridges having a stack direction aligned with the column and a transverse direction orthogonal to the column. It is contemplated that multiple columns of sub-cartridges 22 may be included within filter assembly 14 and/or that multiple filter assemblies 14 may be included within particulate trap 10. Gaseous emissions may enter particulate trap 10 via inlet 16 and flow in parallel through sub-cartridges 22 to exit particulate trap 10 via outlet 20. It is also contemplated that one or more sub-cartridges 22 may be arranged to receive the gaseous emissions in series. The flow through each sub-cartridge 22 may be transverse relative to the stack direction.

Ceramic fibrous mat 24 may electrically and thermally insulate housing 12 from filter assembly 14. It is contemplated that a refractory and electrically non-conductive material other than ceramic such as, for example, a high temperature plastic, may be used to electrically and thermally isolate housing 12 from filter assembly 14.

FIGS. 2A and 2B illustrate a sub-cartridge 22 including a filter media 26 and a base member 28 connected to either side of filter media 26 by a ceramic paste 32. An electrically non-conductive coating 30 may be disposed between filter media 26 and base member 28. Each pair of adjacent sub-cartridges 22 may share a common base member 28 (referring to FIG. 1), or may alternately have dedicated base members 28. Sub-cartridges 22 may be substantially box-shaped, with a length dimension, a width dimension less than the length dimension, and a thickness dimension less than the width dimension. Other dimensional relationships are also contemplated.

Each filter media 26 may have a first end and a second end, with a serpentine shape extending longitudinally from the first end to the second end. Each filter media may include electrically conductive mesh elements that have been sintered together under pressure. The electrically conductive mesh elements may include an iron based material such as, for example, Fecralloy®. It is contemplated that mesh elements may also be implemented that are formed from an electrically-conductive material other than Fecralloy® such as, for example, a nickel based material such as Inconel® or Hastelloy®, or another material known in the art. It is further contemplated that filter media 26 may alternately include electrically non-conductive mesh elements such as, for example, porous elements formed from a ceramic material or a high-temperature polymer. Filter media 26 may have a longitudinal direction from the first end to the second end and a transverse direction, orthogonal to the longitudinal direction. Filter media 26 may be arranged within housing 12 such that the flow of exhaust is in the transverse direction through filter media 26.

Base members 28 may be substantially box-shaped, with a length dimension, a width dimension less than the length dimension, and a thickness dimension less than the width dimension. Alternate dimensional relationships of base member 28 are also contemplated. Base members 28 may be formed from a rigid material such as, for example, steel, a fibrous composite, a ceramic, a high temperature plastic, or any other suitable material. Each base member 28 may be disposed between adjacent filter media 26 to provide structural support to filter assembly 14. Base members 28 may be electrically conductive or electrically non-conductive.

When electrically conductive base members 28 are utilized within particulate trap 10, electrically non-conductive coating 30 may be applied to base member 28 to electrically insulate filter media 26 from base member 28. Electrically non-conductive coating 30 may include any electrically non-conductive material including, for example, a ceramic-based material such as alumina or a high-temperature polymer. Electrically non-conductive coating 30 may be applied to base member 28 through any method known in the art such as, for example, by thermal-spraying.

Ceramic paste 32 may be configured to bond filter media 26 to base member 28, to thermally insulate filter media 26 from base member 28, and to fluidly seal a connection between filter media 26 and base member 28. Ceramic paste 32 may be any ceramic based adhesive that provides sufficient bond strength, ductility, thermal insulating, and fluid sealing characteristics such as, for example, a phosphate glass-based adhesive, a mica-based adhesive, or any other adhesive known in the art.

Sub-cartridge 22 may be assembled by first applying ceramic paste 32 to either base member 28 or filter media 26. Filter media 26 and base member 28 may then be pressed together and ceramic paste 32 cured through a drying process. The drying process may include, for example, allowing ceramic paste 32 to dry at a predetermined temperature for a predetermined period of time. The drying process may also include elevating and then reducing the temperature of the ceramic paste at predetermined rates, or by any other drying process known in the art.

FIGS. 3A and 3B illustrate an exemplary embodiment of sub-cartridge 22 similar to FIGS. 2A and 2B. In this embodiment, however, sub-cartridge 22 may include base members 34 having two grooves 36 located on opposite sides of each base member 34 and aligned with each other in the length and width direction of each base member 34. Each groove 36 may have a generally square cross-section and a path substantially matching the serpentine shape of filter media 26. Each groove 36 may have a width larger than a width of filter media 26 and may be configured to receive both filter media 26 and ceramic paste 32. Groove 36 may provide additional adhering surface area for ceramic paste 32, as well as support against lateral motion of filter media 26 relative to base members 34.

Figures 4A, 4B:
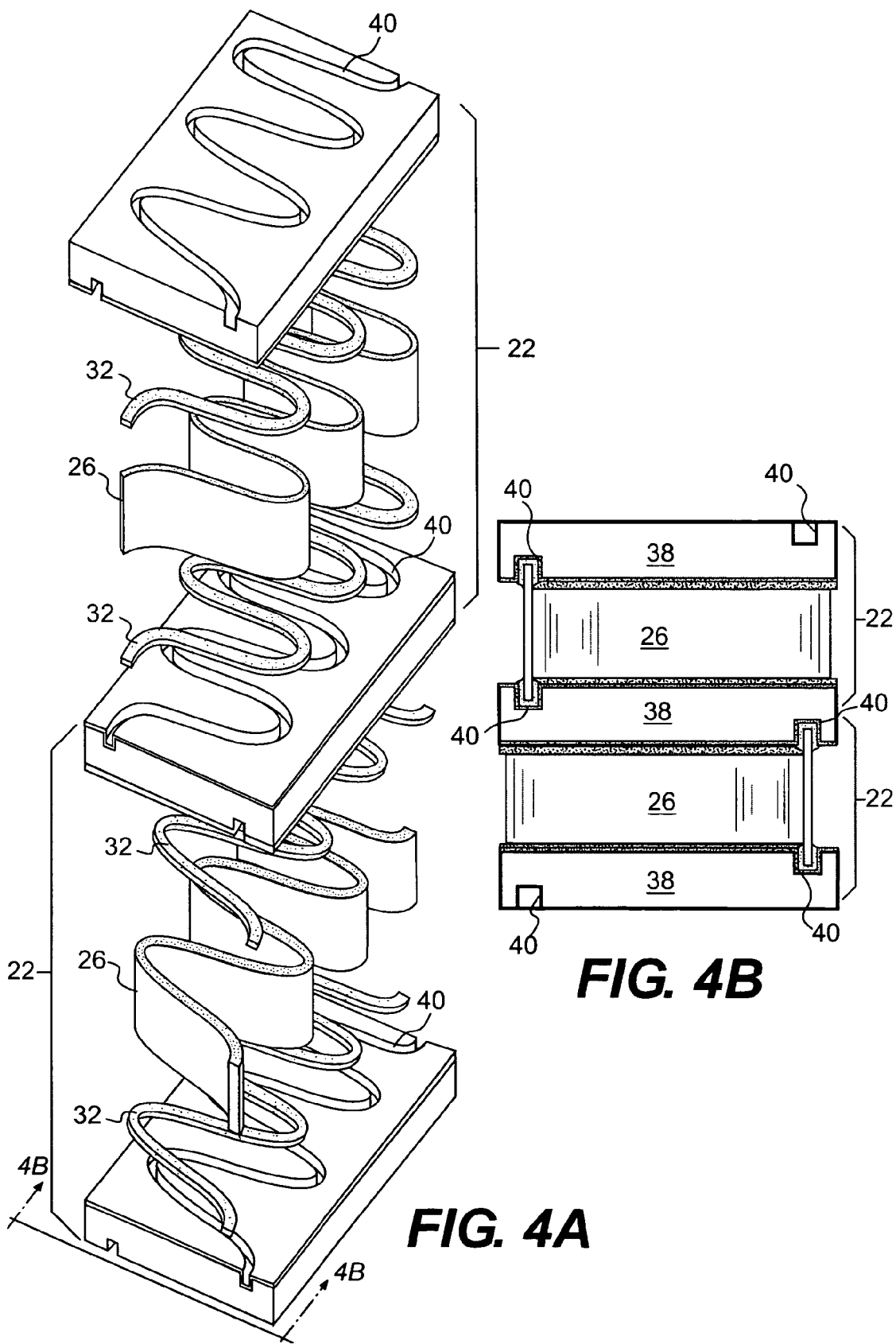
FIG. 4A is an exploded view diagrammatic illustration of two filter elements according to an exemplary disclosed embodiment.
FIG. 4B is an end view diagrammatic illustration of the filter elements of FIG. 4A.

FIGS. 4A and 4B illustrate an exemplary embodiment of two adjacently-stacked sub-cartridges 22, wherein each sub-cartridge 22 may include base members 38 each having two grooves 40 located on opposite sides of each base member 38. However, in contrast to the embodiment of FIGS. 3A and 3B, grooves 40 located on either side of base members 38, may be oriented differently with respect to each other. In particular, grooves 40 may be out of phase with respect to each other. In one embodiment, grooves 40 may be oriented between 0 and 180 degrees out of phase from each other. A phase shift between grooves 40 located on opposite sides of base members 38 may serve to reduce stress concentrations of base members 38. Specifically, stress concentrations may be reduced by limiting an amount of continuous minimum thickness of base members 38. Grooves 40 that are in phase create a continuous minimum thickness along an entire length of base members 38. When grooves 40 within filter assembly 14 are oriented differently between two adjacently stacked sub-cartridges 22, filter media 26 of the two adjacently stacked sub-cartridges 22 may also be oriented between 0 and 180 degrees out of phase with respect to each other to accommodate the phase shift between grooves 40. It is contemplated that grooves 40 may be in phase with each other, but offset from each other along the width dimension of base members 38 to reduce stress concentrations within base members 38. It is further contemplated that grooves 40 on either side of base members 38 may be both out of phase and offset in the width direction relative to each other.

Figure 5:
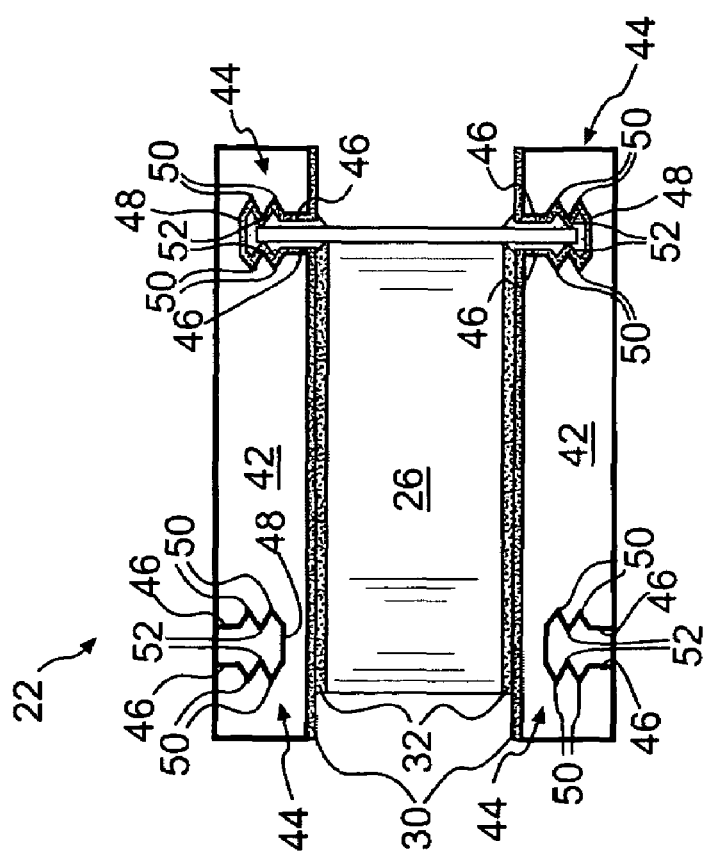
FIG. 5 is an end view diagrammatic illustration of a filter element according to an exemplary disclosed embodiment.

FIG. 5 illustrates an exemplary embodiment of sub-cartridge 22, wherein each sub-cartridge 22 may include base members 42 each having two grooves 44 located on opposite sides of each base member 42. Grooves 44 may each include two sidewall portions 46 and a bottom surface 48, each side wall portion having two recesses 50 separated by a protrusion 52. Recesses 50 and protrusion 52 may increase a bond strength between ceramic paste 32 and base members 42. In particular, ceramic paste 32 that has filled recesses 50 must first be sheared prior to separation of ceramic paste 32 from base members 42. In addition, increased bond strength is further realized because ceramic paste 32 may adhere to the additional surface area of recesses 50 and protrusions 52. It is contemplated that base members 42 may have a greater number of recesses 50 and protrusions 52.

Figure 6:
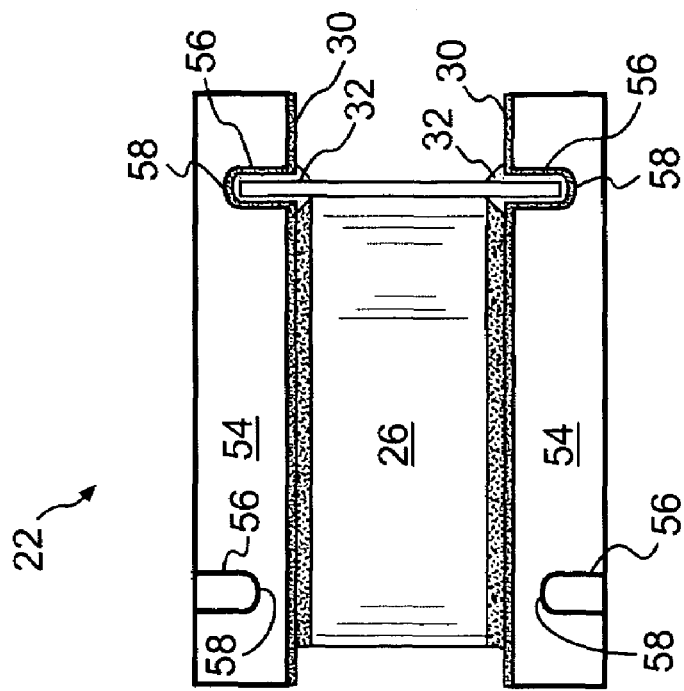
FIG. 6 is an end view diagrammatic illustration of a filter element according to an exemplary disclosed embodiment.

FIG. 6 illustrates an exemplary embodiment of sub-cartridge 22, wherein sub-cartridges 22 each may include base members 54 each having two grooves 56 located on opposite sides of each base member 54. However, in contrast to grooves 36 of FIGS. 3A and 3B, each groove 56 may include a curved bottom surface 58. Curved bottom surface 58 may be configured to reduce stress concentrations within base members 54. The reduced amount of stress concentrations may be particularly advantageous when base members 54 are formed from a brittle material, such as ceramic.

FIG. 7 illustrates an exemplary embodiment of sub-cartridge 22 including at least one filter media 60 disposed between base members 38. Each filter media 60 may include serpentine-shaped electrically conductive Fecralloy mesh elements that have been sintered together under pressure. In contrast to filter media 26 of FIGS. 2A-2B, filter media 60 may include side portions 64 that are deformed during assembly. In particular, base members 38 may be connected to filter media 60 by deformably pressing side portions 64 of filter media 60 into grooves 40 of base members 38. As each side portion 64 deforms within groove 40, pressure may be exerted on sidewall portions 66 of groove 40. The pressure exerted on sidewall portions 66 may be sufficient to retain filter media 60 within grooves 40 without the use of ceramic paste. It is also contemplated that ceramic paste may be used in conjunction with deformably assembled filter media 60.

One base member 38 may be shared between adjacent filter media 60 to provide structural support to filter assembly 14 (referring to FIG. 1). Electrically non-conductive coating 30 may be included within sub-cartridge 22 between side portions 64 and base members 38 when base members 38 are formed from an electrically conductive material.

FIG. 8 illustrates an exemplary embodiment of sub-cartridge 22 having filter media 60 and base members 68. However, in contrast to base members 38 of FIG. 7, each base member 68 may include relief features 70 located on either side of each groove 71. Relief features 70 may allow protrusions 73 between relief features 70 and grooves 71 to flex away from groove 71 as filter media 60 is pressed into grooves 71. It is also contemplated that base members 68 may be formed through a stamping process, with relief features 70 providing a relief of stress built up during the stamping process. Relief features 70, in this manner, may reduce the risk of structurally damaging base members 68 during assembly of sub-cartridge 22 and ensure a tight hold on filter media 60.

Figure 9:
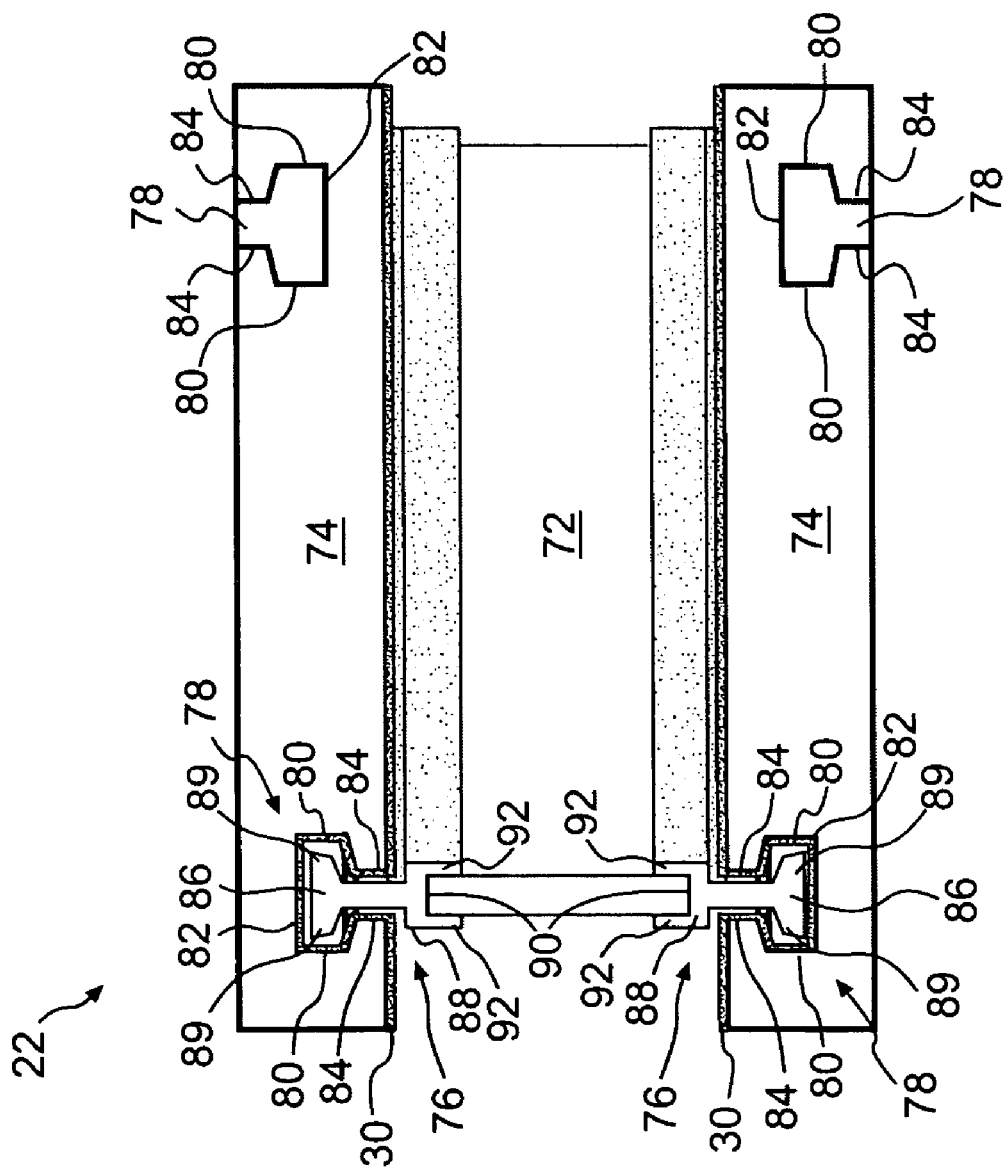
FIG. 9 is a diagrammatic illustration of a filter element according to an exemplary disclosed embodiment.

FIG. 9 illustrates an exemplary embodiment, wherein each sub-cartridge 22 may include at least one filter media 72 and a base member 74 disposed on each side of filter media 72. Each base member 74 may be connected to filter media 72 via a carrier member 76.

Filter media 72 may include serpentine-shaped electrically-conductive Fecralloy mesh elements sintered together under pressure. It is contemplated that mesh elements may also be implemented that are formed from an electrically-conductive material other than Fecralloy. It is further contemplated that filter media 72 may alternately include electrically non-conductive mesh elements such as, for example, porous elements formed from a ceramic material or a high-temperature polymer.

Base members 74 may be substantially box-shaped, with a length dimension, a width dimension less than the length dimension, and a thickness dimension less than the width dimension. Alternate dimensional relationships of base member 74 are also contemplated. Base members 74 may be formed from a rigid material such as, for example, steel, a fibrous composite, a ceramic, a high temperature plastic, or any other suitable material. Base member 74 may be disposed between adjacent filter media 72 to provide structural support to filter assembly 14 (referring to FIG. 1). Base members 74 may be electrically conductive or electrically non-conductive. When electrically conductive base members 74 are utilized within particulate trap 10, electrically non-conductive coating 30 may be applied to base member 74 to electrically insulate filter media 72 from base members 74.

Each base member 74 may include two grooves 78, one located on either side of each base member 74. Grooves 78 may be offset from each other along the width direction of base member 74, out of phase relative to each other, or may be aligned along the width direction of base member 74. It is also contemplated that grooves 78 may both be offset and out of phase relative to each other. Each groove 78 may have a substantially T-shaped cross-section and a trajectory similar to the serpentine shape of filter media 72. Each groove 78 may be configured to receive carrier member 76. The T-shaped cross-section of each groove 78 may include two side wall portions 80, a bottom surface 82, and lips 84 protruding from side walls 80. Lips 84 may be configured to engage carrier member 76 to retain carrier member 76 within grooves 78, as well as support carrier member 76 against lateral motion of filter media 72 relative to base member 74.

Carrier member 76 may include a deformable electrically-conductive metal. It is also contemplated that carrier member 76 may be formed from an electrically non-conductive flexible material such as, for example a high-temperature rubber. Carrier member 76 may have a substantially T-shaped portion 86 and a receiving portion 88. T-shaped portion 86 may include protrusions 89 configured to engage lips 84 during assembly. Receiving portion 88 may include a groove 90, configured to receive filter media 72. Groove 90 may have a width dimension between opposite side wall portions 92. The width dimension of groove 90 may be less than a thickness of filter media 72 such that during assembly, side wall portions 92 of groove 90 flex away from filter media 72 and provide pressure to sides of filter media 72 when assembled, thereby retaining filter media 72 within groove 90. Alternate dimensional relationships of groove 90 are also contemplated.

Sub-cartridge 22 of FIG. 9 may be assembled by positioning end-to-end carrier member 76 and base member 74, aligning T-shaped portion 86 of carrier member 76 with the T-shape of groove 78, and threading carrier member 76 into base member 74. Carrier member 76 may alternately be positioned within base member 74 by aligning the serpentine trajectory of carrier member 76 with the serpentine trajectory of groove 78 and pressing carrier member 76 into base member 74. When pressing carrier member 76 into base member 74, protrusions 89 may flex away from lips 84 as force is applied and return to a substantially unflexed position when T-shaped portion 86 is aligned within the T-shape of groove 78. Once carrier member 76 is positioned within groove 78 of base member 74, filter media 72 may be pressed into groove 90 of carrier member 76.

INDUSTRIAL APPLICABILITY

The disclosed filter element may be applicable to a particulate trap used for any combustion-type device such as, for example, an engine, a furnace, or any other device known in the art where the removal of particulate matter from an exhaust flow is desired. It is also contemplated that disclosed particulate filter element may be used with a non-combustion type device such as, for example, a dust collection system.

Because sub-cartridges 22 are designed for close stacking of one sub-cartridge 22 on top of another sub-cartridge 22, particulate trap 10 may be compact with little or no wasted space between sub-cartridges 22. In addition, because sub-cartridges 22 are stackable into a filter assembly 14 and multiple filter assemblies 14 may be included within particulate trap 10, particulate trap 10 may be expandable in both a length direction and a transverse direction. Further, because sub-cartridge 22 is supported on two opposite sides, sub-cartridge 22 is substantially stable and capable of resisting vibrational loading. This resistance to vibrational loading may provide for extended life of particulate trap 10.

It will be apparent to those skilled in the art that various modifications and variations can be made to the disclosed filter element without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A filter element comprising:
a filter media;
at least one base member;
a ceramic paste connecting the filter media to the at least one base member;
wherein the at least one base member includes at least one groove configured to receive the filter media and the ceramic paste.

2. The filter element of claim 1, wherein the filter media has a serpentine shape.

3. The filter element of claim 1, wherein the at least one groove has a substantially square cross-section.

4. The filter element of claim 1, wherein the at least one groove includes:
two side wall portions;
a bottom surface; and
at least one recess within each sidewall portion.

5. The filter element of claim 1, wherein the at least one groove has a curved bottom surface.

6. A filter element comprising:
a filter media;
at least one base member;
a ceramic paste connecting the filter media to the at least one base member;
wherein the at least one base member includes a first groove located on a first side of the at least one base member and a second groove located on a second side of the at least one base member opposite the first side, at least one of the first and second grooves configured to receive the filter media and the ceramic paste.

7. The filter element of claim 6, wherein the base has a length direction, a width direction, and a thickness and the first and second grooves are offset from each other in at least one of the length direction and the width direction.

8. The filter element of claim 6, wherein the ceramic paste includes a phosphate glass-based adhesive.

9. The filter element of claim 6, wherein the ceramic paste includes a mica-based adhesive.

10. The filter element of claim 6, wherein the ceramic paste substantially fluidly isolates and thermally insulates the filter media from the at least one base member.

11. The filter element of claim 6, further including a ceramic coating between the at least one base member and the ceramic paste.

12. The filter element of claim 11, wherein the ceramic coating includes alumina.

13. The filter element of claim 6, wherein the at least one base member includes an electrically non-conductive material.

14. The filter element of claim 6, wherein the at least one base member includes steel.

15. The filter element of claim 6, wherein the filter media includes a sintered metal mesh.

16. The filter element of claim 6, wherein the filter media includes a ceramic material.

17. A filter element, comprising:
a filter media;
a base member having at least one groove;
at least one carrier connected to the filter media and having a protrusion configured to engage the at least one groove; and
a ceramic paste disposed between the carrier and the at least one base member.

18. The filter element of claim 17, wherein the at least one groove has at least one lip configured to retain the protrusion within the at least one groove.

19. The filter element of claim 17, wherein the carrier includes metal.

20. The filter element of claim 17, wherein the carrier includes rubber.

21. A filter assembly, comprising:
a housing;
a plurality of filter elements disposed within the housing, each filter element including:
at least one filter media;
at least one base member; and
a ceramic paste connecting the at least one filter media to the at least one base member; and
a ceramic fiber mat disposed between the housing and the at least one base member of at least one of the plurality of filter elements.

22. The filter assembly of claim 21, wherein the at least one filter media is serpentine shaped and disposed between the at least one base member of two adjacent filter elements of the plurality of filter elements.

23. The filter assembly of claim 21, wherein the at least one base member is disposed between the at least one filter media of two adjacent filter elements of the plurality of filter elements.

24. The filter assembly of claim 23, wherein the at least one base member includes a first groove located on a first side of the at least one base member and a second groove located on a second side of the at least one base member opposite the first side, each of the first and second grooves configured to receive the at least one filter media and the ceramic paste of adjacent filter elements of the plurality of filter elements.

25. The filter assembly of claim 24, wherein the at least one base member has a length direction, a width direction, and a thickness and the first and second grooves are offset from each other in at least one of the width direction and the length direction.

26. A method of assembling a filter element having a filter media and at least one base member, comprising:
    applying a ceramic paste to at least one of the filter media and a groove in the at least one base member;
    pressing the filter media into the groove in the at least one base member; and
    curing the ceramic paste.

27. The method of claim 26, wherein the filter media includes a sintered metal mesh.

28. The method of claim 26, further including applying a ceramic coating to the at least one base member.

29. The method of claim 28, wherein the ceramic coating includes alumina.

30. A method of assembling a filter element, comprising:
    positioning a carrier member into a groove of a base member;
    retaining the carrier member within the groove with a lip of the base member;
    pressing a filter media into the carrier member; and
    applying a ceramic coating to the base member, wherein the carrier member includes an electrically conductive material and the ceramic coating is electrically non-conductive.

31. The method of claim 30, wherein the base member includes an electrically non-conductive material.

32. A filter assembly, comprising;
a plurality of filter media;
each filter media including a filtering surface and an edge;
at least one base member including at least first and second sides, each side configured to receive a filter media;
an edge of one filter media of the plurality of filter media being secured to the first side of the base member and an edge of another filter media of the plurality of filter media being secured to the second side of the base member;
wherein the at least one base member includes a first groove located on the first side of the at least one base member and a second groove located on the second side of the at least one base member, each of the first and second grooves being configured to receive one of said plurality of filter media; and
further including a ceramic paste connecting at least one of the plurality of filter media to the at least one base member.

33. A filter assembly, comprising:
a plurality of filter media;
each filter media including a filtering surface and an edge;
at least one base member including at least first and second sides, each side configured to receive a filter media;
an edge of one filter media of the plurality of filter media being secured to the first side of the base member and an edge of another filter media of the plurality of filter media being secured to the second side of the base member;
wherein the at least one base member includes a first groove located on the first side of the at least one base member and a second groove located on the second side of the at least one base member, each of the first and second grooves being configured to receive one of said plurality of filter media; and
wherein the at least one base member has a length direction, a width direction, and a thickness, and the first and second grooves are offset from each other in at least one of the width direction and the length direction.

34. A method of assembling a filter, comprising:
securing an edge of one filter media to a first side of a base member;
securing an edge of a second filter media to an opposite side of the base member;
wherein securing an edge of the one filter media includes pressing the one filter media into a groove in the first side of the base member, and securing an edge of the second filter media includes pressing the edge of the second filter media into a groove in the opposite side of the base member; and
wherein pressing includes deforming a portion of the filter media within the groove, thereby connecting the filter media to the base member.

* * * * *